(12) United States Patent
Iwai et al.

(10) Patent No.: US 6,562,089 B1
(45) Date of Patent: May 13, 2003

(54) HYBRID TYPE RESINOID GRINDSTONE WITH ABRASIVE AGGLOMERATES IN WHICH SOL-GEL ABRASIVE GRAINS ARE HELD BY VITRIFIED BOND

(75) Inventors: Kouji Iwai, Toki (JP); Tsuguo Kusakabe, Okazaki (JP)

(73) Assignee: Noritake Co., Limited, Nagoya (JP)

( * ) Notice: Subject to any disclaimer, the term of this patent is extended or adjusted under 35 U.S.C. 154(b) by 0 days.

(21) Appl. No.: 09/688,968

(22) Filed: Oct. 17, 2000

(30) Foreign Application Priority Data

Oct. 19, 1999 (JP) ............................................. 11-296955

(51) Int. Cl.⁷ .............................. B24D 3/00; B24D 3/02; B24D 3/14; B24D 3/28
(52) U.S. Cl. .............................. 51/298; 51/307; 51/309; 51/293
(58) Field of Search ........................... 51/298, 307, 309, 51/293

(56) References Cited

U.S. PATENT DOCUMENTS 3,982,359 A * 9/1976 Elbel et al. .................... 51/298
4,541,842 A * 9/1985 Rostoker ...................... 51/298
6,056,794 A * 5/2000 Stoetzel et al. ................ 51/309

FOREIGN PATENT DOCUMENTS

| EP | 0 692 342 A2 | 1/1996 |
| JP | 55-75462 | 5/1980 |
| JP | 01-183370 | 7/1989 |
| JP | 01-216774 | 8/1989 |
| JP | 02-274466 | 11/1990 |
| JP | 4-250983 | 9/1992 |
| JP | 11-156727 | 6/1999 |

* cited by examiner

*Primary Examiner*—Michael Marcheschi
(74) *Attorney, Agent, or Firm*—Oliff & Berridge, PLC

(57) ABSTRACT

A hybrid type resinoid grindstone including abrasive agglomerates which are held together by a thermosetting synthetic resin used as a bonding agent, wherein each of the abrasive agglomerates includes sol-gel abrasive grains which are held together by a vitrified bonding agent. In the present hybrid type resinoid grindstone of the present invention, each of the sol-gel abrasive grains, which are held together by the vitrified bonding agent, restores its sharpness as a result of each of the successive removals of fine crystals with application of an impact or shock to the sol-gel abrasive grain, as in a vitrified grindstone, during a grinding operation.

10 Claims, 3 Drawing Sheets

HYBRID TYPE RESINOID GRINDSTONE WITH ABRASIVE AGGLOMERATES IN WHICH SOL-GEL ABRASIVE GRAINS ARE HELD BY VITRIFIED BOND

BACKGROUND OF THE INVENTION

1. Field of the Invention

The present invention relates in general to a hybrid type resinoid grindstone which has a resinoid abrasive structure containing abrasive aggregates or agglomerates each having a vitrified abrasive structure, and more particularly to such a hybrid type resinoid grindstone in which each of the abrasive agglomerates includes sol-gel abrasive grains held together by a vitrified bonding agent.

2. Discussion of the Related Art

There is known a resinoid grindstone in which abrasive grains are held together by a thermosetting synthetic resin used as a bonding agent. The resinoid grindstone is elastically deformed in a larger amount when a grinding load is applied thereto, than a vitrified grindstone. Further, the resinoid grindstone has a smaller degree of strength for holding or bonding the abrasive grains together, and a lower degree of wear resistance than the vitrified grindstone. Due to such characteristics thereof, the resinoid grindstone is not capable of satisfying a recent demand for grinding or removing a larger volume of material from a workpiece with a higher efficiency, even where the abrasive structure of the resinoid grindstone is modified to have a higher bonding strength and a higher density.

Where the grindstone takes the form of a gear grinding wheel having a tooth profile which is formed in its outer or inner circumferential surface and which conforms to a tooth profile of a gear to be honed or ground as a workpiece, the grinding wheel has to be periodically or cyclically dressed so as to maintain its tooth profile so that the tooth profile of the gear formed by the grinding wheel is so maintained. That is, when the tooth profile is changed to a certain extent due to wear of the grinding wheel, or when the amount of wear of the grinding wheel exceeds a predetermined amount, the grinding wheel has to be subjected to a dressing operation so as to rectify or reshape the tooth profile. The dressing cycle or interval is closely related with a service life of the grinding wheel. The wear resistance of the grinding wheel could be improved by using a resinoid grindstone of hard grade or a resinoid grindstone having a high bonding strength. However, such a resinoid grindstone of hard grade does not have a high degree of sharpness and is not accordingly capable of removing a large volume of material from a workpiece with a high efficiency.

In an attempt to increase the rate of material removal from a workpiece with an increased degree of sharpness, there is proposed a resinoid grindstone, as disclosed in EP 0692342 A2, in which sintered alumina abrasive grains are held together by a vitrified bonding agent so as to form each of abrasive agglomerates, and the abrasive agglomerates are held together by an epoxy or other thermosetting synthetic resin. This resinoid grindstone exhibits an increased degree of bonding strength for bonding the abrasive grains, but suffers from breakage or wear of each abrasive grain in a relatively short time after the initial use. Thus, the proposed resinoid grindstone is not satisfactory in order to prolong the dressing interval and the service life of the grindstone.

There is also proposed a resinoid grindstone in which so-called sol-gel abrasive grains are held together by a bonding agent in the form of a thermosetting synthetic resin. The sol-gel abrasive grains are polycrystals each of which is obtained in a sol-gel method by combining submicron-sized, fine crystals together with each other, so that each of the sol-gel abrasive grains breaks down to expose a new sharp cutting edge as each sol-gel abrasive grain becomes dull. That is, the sol-gel abrasive grain is expected to present a new sharp cutting edge as a result of small breakage of the abrasive grain, which breakage is smaller than that in an ordinary sintered abrasive grain. In other words, the sol-gel abrasive grain is expected to restore its sharpness as a result of each of the successive removals of the fine crystals. However, such expected restoration of the sharpness is not satisfactorily achieved in this proposed resinoid grindstone. This is probably because an impact or shock, which is required to be applied to the abrasive grain for causing the small breakage of the sol-gel abrasive grain or the removal of the fine abrasive grain, is actually absorbed by elasticity of the thermosetting synthetic resin which holds the sol-gel abrasive grains, so that the expected restoration of the sharpness is not satisfactorily achieved in this proposed resinoid grindstone.

SUMMARY OF THE INVENTION

It is therefore an object of the present invention to provide a resinoid grindstone which has a high degree of sharpness while having an increased degree of wear resistance with a high degree of strength of bonding abrasive grains, and which is accordingly capable of grinding a workpiece to remove a large amount of stock with a high efficiency.

This object may be achieved according to the principle of the present invention, which provides a hybrid type resinoid grindstone comprising abrasive agglomerates which are held together by a thermosetting synthetic resin used as a bonding agent, wherein each of the abrasive agglomerates includes sol-gel abrasive grains which are held together by a vitrified bonding agent.

In the hybrid type resinoid grindstone of the present invention, the abrasive agglomerates, each of which is formed of the plurality of sol-gel abrasive grains and is accordingly lager than each sol-gel abrasive grain, are firmly bonded to each other by the bonding agent in the form of the thermosetting synthetic resin. Each of the sol-gel abrasive grains, which are held together by the vitrified bonding agent, restores its sharpness as a result of each of the successive removals of fine crystals with application of an impact or shock to the sol-gel abrasive grain, as in a vitrified grindstone. Thus, the present hybrid type resinoid grindstone exhibits a high degree of sharpness while having an increased degree of wear resistance with a high degree of bonding strength, and is accordingly capable of grinding a workpiece to remove a large amount of stock from the workpiece with a high efficiency.

According to a first preferred form of the invention, the hybrid type resinoid grindstone contains at least 5%, more preferably at least 20% of the abrasive agglomerates per total weight of all abrasive grains contained in the hybrid type resinoid, for further increasing the degree of sharpness of the hybrid type resinoid grindstone so that the grindstone is capable of further efficiently grinding a workpiece having a large amount of stock.

According to a second preferred form of the hybrid type resinoid grindstone of the invention, each of the sol-gel abrasive grains has a grain size of F60–F100, i.e., about $\frac{1}{100}$ inch $\frac{1}{60}$ inch.

According to a third preferred form of the invention, the hybrid resinoid grindstone is a gear grinding wheel including a tooth profile portion having teeth formed therein, and further comprises individual abrasive grains which are held together by the thermosetting synthetic resin.

The hybrid type resinoid grindstone of this third preferred from of the invention is the gear grinding wheel in which the individual abrasive grains, as well as the abrasive agglomerates, are held together by an epoxy resin or other thermosetting synthetic resin. Each of the sol-gel abrasive grains which are held together by the vitrified bonding agent restores its sharpness as a result of the successive removals of the fine crystals upon application of an impact or shock to the sol-gel abrasive grain, as in a vitrified grindstone, during a grinding operation, even if the present gear grinding wheel is adapted to have an increased degree of bonding strength and an accordingly increased degree of wear resistance so as to hone or grind the tooth faces of a gear which has been hardened in its surface. Thus, the present gear grinding wheel is capable of performing a grinding operation in which a large volume of material has to be removed from a workpiece with high accuracy and efficiency.

According to one arrangement of the third preferred form of the hybrid type resinoid grindstone of the invention, the gear grinding wheel has the tooth profile portion in an inner circumferential surface thereof.

According to a fourth preferred form of the invention, the hybrid type resinoid grindstone is a porous epoxy grindstone which is used for grinding a cutter, and further comprises individual abrasive grains which are held together by the thermosetting synthetic resin.

The hybrid type resinoid grindstone of this fourth preferred from of the invention is the porous epoxy grindstone. This porous epoxy grindstone may be produced by a method including a step of mixing the abrasive agglomerates, the individual abrasive grains and the thermosetting synthetic resin in the form of a liquid epoxy resin, so as to form a mixture thereof, and a step of introducing the mixture into a mold and then hardening the liquid epoxy resin. Each of the sol-gel abrasive grains which are held together by the vitrified bonding agent restores its sharpness as a result of the successive removals of the fine crystals upon application of an impact or shock to the sol-gel abrasive grain, as in a vitrified grindstone, during a grinding operation, even if the present porous epoxy grindstone is adapted to have an increased degree of bonding strength and an accordingly increased degree of wear resistance so as to grind a cutter which has been hardened in its surface. Thus, the present porous epoxy grindstone is capable of performing a grinding operation in which a large amount of stock has to be removed from a workpiece with high accuracy and efficiency.

BRIEF DESCRIPTION OF THE DRAWINGS

The above objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
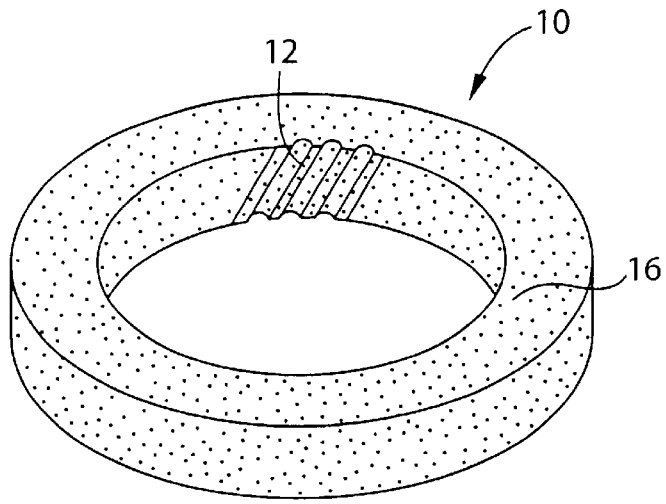
FIG. 1 is a perspective view showing a hybrid type resinoid grindstone in the form of a gear honing or grinding wheel constructed according to a first embodiment of this invention.

FIG. 1 shows a hybrid type resinoid grindstone in the form of a gear honing or grinding wheel 10 which is constructed according to a first embodiment of this invention. The gear grinding wheel 10 has a tooth profile portion 12 in an inner circumferential surface thereof, and may be accordingly referred to as an internally-toothed grinding wheel, where appropriate. The tooth profile portion 12 has a plurality of, for example, 144 teeth which conforms in shape to teeth of a helical gear 18, which is a workpiece to be honed or ground.

Figure 2A:
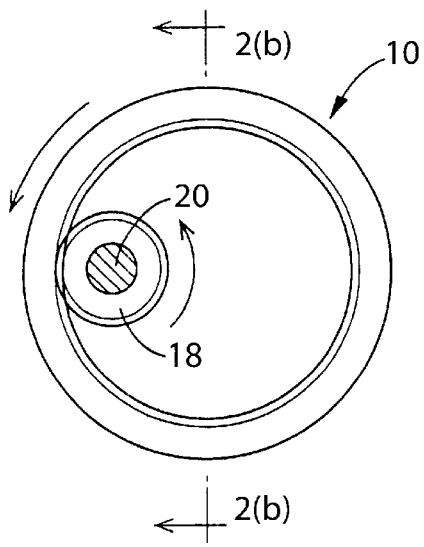
FIG. 2(a) is a view illustrating an operation in which a gear is honed or ground by the gear grinding wheel of FIG. 1.
Figure 2B:
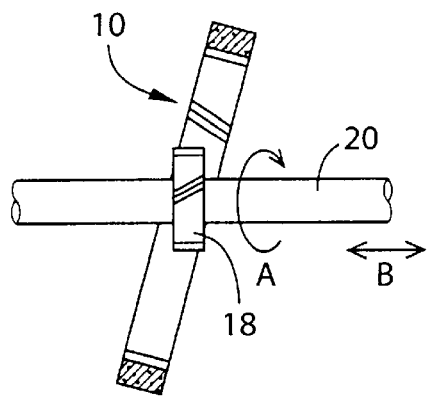
FIG. 2(b) is a view taken along line 2(b)—2(b) of FIG. 2(a)

FIGS. 2(a) and 2(b) show a grinding operation in which the helical gear 18 is rotated about its axis in a predetermined direction A by the gear grinding wheel 10 which meshes with the helical gear 18 and which is driven by a driving mechanism (not shown), and is reciprocated in its axial direction B as shown in the figures, so that the helical gear 18 is ground by the gear grinding wheel 10 so as to have a predetermined degree of configurational accuracy. Prior to the grinding operation, the helical gear 18 is mounted on a rotary mandrel or shaft 20 which is rotatably held at its axially opposite end portions (not shown), such that the helical gear 18 and the rotary shaft 20 are rotatable together and are not displaceable relative to each other in the axial direction. The gear grinding wheel 10 is rotatably held at its outer circumferential surface by a holder (not shown) so as to be positioned relative to the thus mounted helical gear 18 such that the grinding wheel 10 meshes at the tooth profile portion 12 with the helical gear 18. That is, the axis of the grinding wheel 10 is inclined with respect to the axis of the helical gear 18 by a predetermined angle as shown in FIG. 2(b), and the axis of the grinding wheel 10 is spaced apart from the axis of the helical gear 18 by a predetermined distance as shown in FIG. 2(a). During the grinding operation, the grinding wheel 10 is rotated by the driving mechanism while meshing with the helical gear 18, and the helical gear 18 is driven by the grinding wheel 10, so that the teeth of the helical gear 18 are ground by the tooth profile portion 12 of the grinding wheel 10 with high precision.

Figure 3:
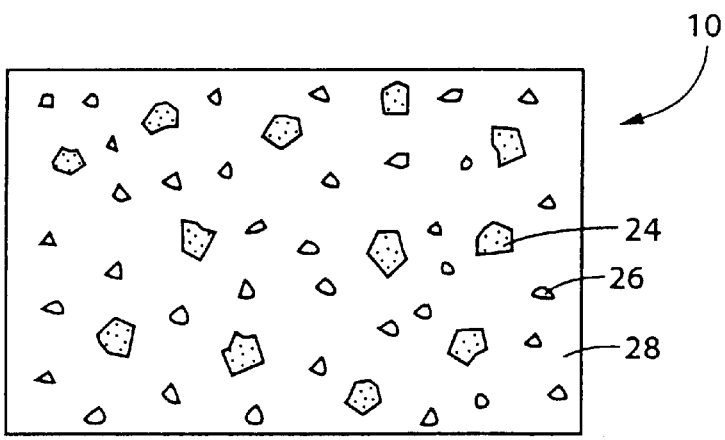
FIG. 3 is a view showing an abrasive structure of the gear grinding wheel of FIG. 1.

The gear grinding wheel 10 has, in its radially inner portion, an abrasive portion 16 consisting of a resinoid abrasive structure. This resinoid abrasive structure is constituted by abrasive agglomerates 24 each of which consists of a vitrified abrasive structure, ordinary individual abrasive grains 26, and a thermosetting synthetic resin bonding agent in the form of an epoxy resin 28 which has an elastic modulus of about 15 GPa and which bonds the abrasive agglomerates 24 and the individual abrasive grains 26 together with each other, as shown in FIG. 3. The gear grinding wheel 10 is produced according to the same process as an ordinary resinoid grindstone, which process includes a step of mixing materials, a step of press-molding or injection-molding the mixture, and a step of hardening or curing the thermosetting synthetic resin bonding agent.

Each abrasive agglomerate 24 is a small mass or particle having a high degree of rigidity and a size of about F20, and is prepared by combining a plurality of sol-gel abrasive grains together with each other by a glassy vitrified bonding agent having an elastic modulus of about 30 GPa. Each of the sol-gel abrasive grains is a polycrystal which is prepared according to a sol-gel method by combining submicron-sized, fine crystals together with each other, and has a so-called self-sharpening capability or spontaneous edge-forming capability for restoring its sharpness from time to time owing to small breakage of the abrasive grain or successive removals of the fine crystals from the abrasive grain. The abrasive agglomerate 24 is prepared according to the same process as a known vitrified grindstone, which process includes a material mixing step, a firing step, a crushing step and a classifying step. Described more specifically, the abrasive agglomerate 24 may be obtained by (i) mixing the sol-gel abrasive grains each having a size of about F80–F100, the vitrified bonding agent, caking additives and other materials; (ii) firing the mixed materials at about 900° C., (iii) crushing a vitrified grindstone which has been obtained at the firing step, into pieces; and (iv) screening the pieces so as to select, as the abrasive agglomerates 24, ones of the pieces each having a predetermined size. This process may be modified such that the mixture is formed into a mass having a sheet-like or other shape so that the formed mass is fired and then crushed into pieces.

Figure 4:
FIG. 4 is an enlarged view showing sol-gel abrasive grains which are included in one of abrasive agglomerates in the abrasive structure of FIG. 3.

The sol-gel abrasive grain is a combination of a multiplicity of fine crystals and has a multiplicity of micro cutting edges, as shown in an image of FIG. 4 which is taken by an electron microscope. The sol-gel abrasive grain has a self-sharpening capability or property of exposing new sharp cutting edges from time to time owing to successive removals of the fine crystals from the abrasive grain, thereby preventing an increase of adhesion of metal particles which are removed from the workpiece, to the grinding surface of the grinding wheel 10, and accordingly reducing possibilities of glazing of the grinding surface and chatter marks on the ground surface of the workpiece, even where the grinding wheel 10 receives a high grinding resistance from the workpiece in a grinding operation. Thus, the grinding wheel 10 has a high grinding ratio and a high degree of durability, and exhibits a grinding performance about 5–10 times that of a grinding wheel which employs ordinary individual abrasive grains but does not employ abrasive agglomerates.

During a grinding operation, an impact or shock is required to be successively applied to the sol-gel abrasive grain for causing successive removals of the fine crystals from the sol-gel abrasive grain. In a conventional resinoid grindstone in which only individual sol-gel abrasive grains are held together by a thermosetting synthetic resin bonding agent (resin bond), the impact or shock which is applied to the grindstone is absorbed by the resin bonding agent, so that the sol-gel abrasive grain does not necessarily exhibit its self-sharpening capability or property. In the gear grinding wheel 10 of this invention, on the other hand, the plurality of sol-gel abrasive grains are combined by the vitrified bonding agent into each of the abrasive agglomerates, and the abrasive agglomerates are held together by the thermosetting synthetic resin bonding agent, so that the sol-gel abrasive grain constantly exhibits the self-sharpening capability or property.

Figure 5:
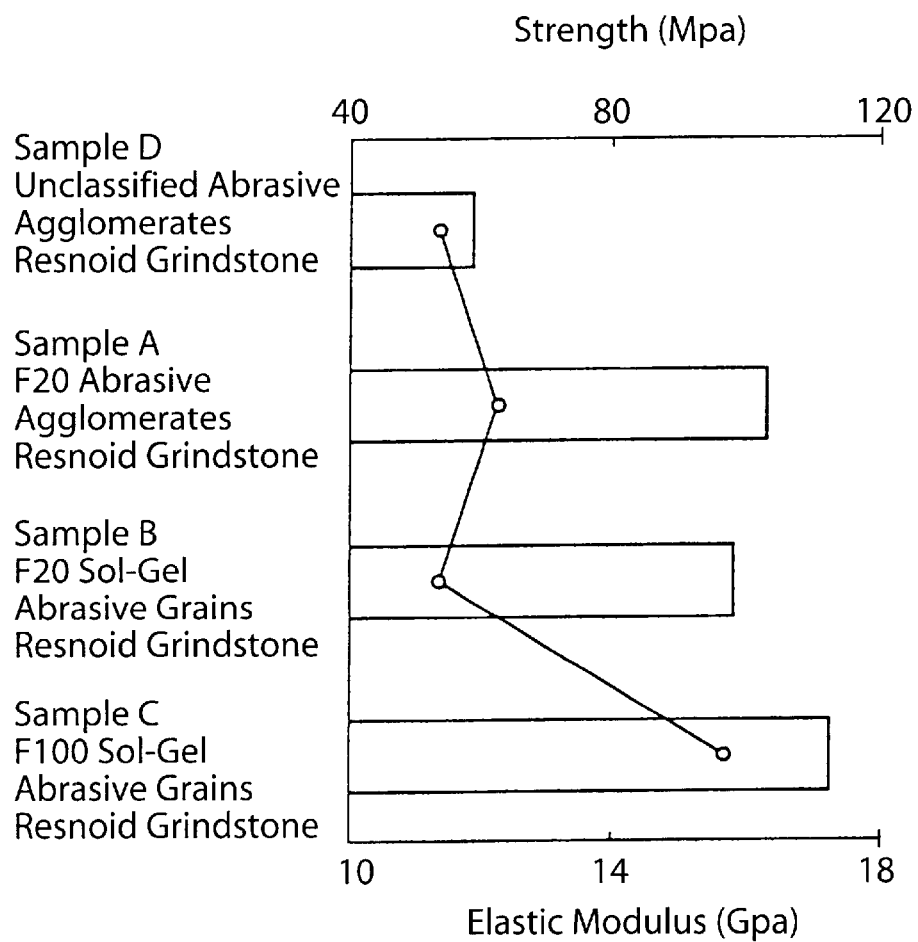
FIG. 5 is a graph indicating a strength and an elastic modulus of a sample A which corresponds to an abrasive portion of the gear grinding wheel of FIG. 1, as compared with those of a sample B which includes sol-gel abrasive grains of F20, a sample C which includes sol-gel abrasive grains of F100 and a sample D which includes unclassified abrasive agglomerates.

In the gear grinding wheel 10 (corresponding to a sample A of FIG. 5) constructed as described above, the epoxy resin enters or fills cavities and pores in the abrasive agglomerates 24, so that the gear grinding wheel 10 has a strength as high as that of a resinoid grindstone (corresponding to a sample C of FIG. 5) in which individual sol-gel abrasive grains each having a size of about F100 are held together by an epoxy resin, and has an elastic modulus as low as that of a resinoid grindstone (corresponding to a sample B of FIG. 5) in which individual sol-gel abrasive grains each having a size of about F20 are held together by an epoxy resin. In general, the strength of the grindstone reduces with an increase in the size of each abrasive grain. However, the reduction in the strength of the gear grinding wheel 10 is minimized owing to the construction in which the epoxy resin 28 penetrates or permeates into the abrasive agglomerates 24, whereby the abrasive agglomerates 24 are firmly held together by the epoxy resin 28. Thus, the gear grinding wheel 10 is given not only a suitable degree of elasticity but also a high degree of rigidity which permits the gear grinding wheel 10 to grind a workpiece at an increased rate of material removal from the workpiece. It is noted that a sample D of FIG. 5 is a resinoid grindstone in which abrasive grains each having a size of about F100 are combined by a vitrified bonding agent into abrasive agglomerates each having a size of 2–8 mm, and the abrasive agglomerates are held together by an epoxy resin without screening or classifying the abrasive agglomerates. The abrasive agglomerates are dispersed unevenly in this resinoid grindstone since the abrasive agglomerates are not classified.

There will be described an experiment conducted by the present inventors, using two internally-toothed grinding wheels, i.e., the above-described sample A (abrasive grains WA/X2, grain size 100, grade R, structure 7, epoxy resin bond Y) and a sample E (abrasive grains WA, grain size 80, grade R, structure 7, epoxy resin bond Y) which were prepared according to a known method so as to have respective compositions as specified below. In the experiment, grinding operations were performed on a workpiece in a condition as specified below, by the two gear grinding wheels of the samples A and E which have the same shape as specified below. The experiment revealed that a depth of grinding (OBD measurement value) was 50 μm where the workpiece was ground by the sample E, and that a depth of grinding (OBD measurement value) was 100 μm where the workpiece was ground by the sample A. That is, the sample A exhibited a higher rate of material removal from the workpiece with a higher degree of sharpness, than the sample E.

[Composition of Sample A]
  Abrasive grains Vg=49% by volume (76.3 wt %) of mixed abrasive grains prepared by mixing 15.3 wt % of abrasive agglomerates having a grain size of F20 and 61.0 wt % of WA (white alundum) having a grain size of F100 (15.3 wt % of the abrasive agglomerates and 61.0 wt % of WA correspond to 20% by volume and 80% by volume in the mixed abrasive grains, respectively.)
  Bond Vb=47% by volume (23.3 wt %) of epoxy resin
  Pores=4% by volume
  Nominal specific gravity: 2.50

[Composition of Sample E]
  Abrasive grains Vg=49% by volume (76.7 wt %) of WA having a grain size of F80
  Bond Vb=47% by volume (23.3 wt %) of epoxy resin
  Nominal specific gravity: 2.54

[Shape of the Grinding Wheel]
  Dimensions=φ350 mm (outside diameter)×27 mm (thickness)×φ293.4 mm (inside diameter)
  Tooth profile portion
    Module=2.2, Number of teeth (Z)=127,
    Pressure angle (P)=17.5, Helix angle=21.17'
[Workpiece (Helical Gear)]
  Number of teeth (Z)=53, Helix angle=31.5',
  Material=SCr 420
[Grinding Condition]
  Number of revolutions of grinding wheel=500 rpm,
  Grinding fluid=oil As described above, the gear grinding wheel 10 consists of the abrasive structure in which the sol-gel abrasive grains are combined by the vitrified bonding agent into each of the abrasive agglomerates 24 and then the abrasive agglomerates 24 are held together by the thermosetting synthetic resin bonding agent in the form of the epoxy resin 28. The abrasive agglomerates 24, each of which is larger than each sol-gel abrasive grain, are firmly held by the thermosetting synthetic resin bonding agent. Each of the sol-gel abrasive grains, which are bonded to each other by the vitrified bonding agent having a high degree of rigidity, restores its sharpness as a result of each of the successive removals of the fine crystals by application of an impact or shock to the sol-gel abrasive grain, as in a vitrified grindstone. Thus, the gear grinding wheel 10 exhibits a high degree of sharpness, and is accordingly capable of efficiently grinding a workpiece that is required to be ground to remove a large amount of material, at a high removal rate.

Even if the gear grinding wheel 10 is adapted to have an increased degree of bonding strength and an accordingly increased degree of wear resistance, each sol-gel abrasive grain of the gear grinding wheel 10 exhibits its self-sharpening capability owing to the construction in which the abrasive agglomerates 24 and the individual abrasive grains 26 are held together by the epoxy resin 28. That is, each sol-gel abrasive grain of the gear grinding wheel 10 restores its sharpness successively or from time to time as a result of successive removals of the fine crystals upon application of an impact or shock to the sol-gel abrasive grain, as in a vitrified grindstone, during a grinding operation, for example, where the gear grinding wheel 10 is used to hone or grind the tooth faces of a gear which has been hardened in its surface. Thus, the gear grinding wheel 10 is capable of performing a grinding operation in which a large amount of stock has to be removed from a workpiece with a high accuracy and a high efficiency. The gear grinding wheel 10 as a whole has a suitable degree of elastic modulus, namely, a relatively high degree of elastic modulus which permits the gear grinding wheel 10 to grind the workpiece with a large depth of cut. Further, the gear grinding wheel 10 is capable of performing a grinding operation, which has to be performed by a resinoid grindstone, with an increased efficiency.

In the gear grinding wheel 10, the content of the abrasive agglomerates 24 in all the abrasive grains contained in the abrasive structure of the grinding wheel 10 is preferably at least 5 wt %, more preferably at least 20 wt %. That is, the total weight of the abrasive agglomerates 24 is preferably at least 5%, and more preferably at least 20% of the total weight of all the abrasive grains, for further increasing the degree of sharpness of the gear grinding wheel 10 so that the gear grinding wheel 10 is capable of more efficiently grinding a workpiece having a large amount of stock to be removed.

The grain size of each of the sol-gel abrasive grains, which constitute each abrasive agglomerate 24, is preferably F60–F100. The grade or bonding strength of the abrasive agglomerates 24 is preferably L or M. The content of the vitrified bonding agent in each of the abrasive agglomerates 24 is preferably about 15 wt %.

Figure 6:
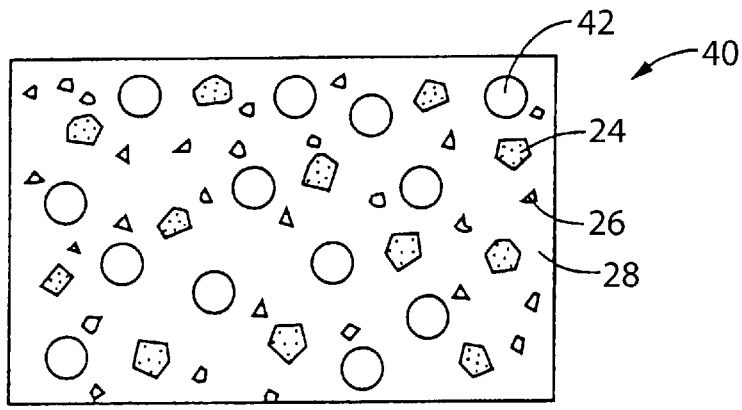
FIG. 6 is a view showing an abrasive structure of a hybrid type resinoid grindstone in the form of a porous epoxy grindstone constructed according to a second embodiment of this invention.

Referring next to FIG. 6, there will be described a hybrid type resinoid grindstone in the form of a porous epoxy grindstone 40 constructed according to a second embodiment of this invention. In the second embodiment of FIG. 6, the same reference numerals as used in the above-described first embodiment will be used to identify the elements which are the same as or similar to those in the first embodiment. No redundant description of these elements will be provided.

FIG. 6 shows an abrasive structure of the porous epoxy grindstone 40 which is used for grinding a cutter. The porous epoxy grindstone 40 has a resinoid abrasive structure which contains abrasive agglomerates 24 each having a vitrified abrasive structure. That is, the porous epoxy grindstone 40 has the resinoid abrasive structure in which the abrasive agglomerates 24, the individual abrasive grains 26 and a pore forming agent 42 are held together by the epoxy resin 28, and is produced according to a process similar to a known process of producing an ordinary resinoid grindstone, which process includes a step of mixing predetermined amounts of respective materials in the form of the abrasive agglomerates 24, the individual abrasive grains 26, the pore forming agent 42 and the liquid epoxy resin 28 so as to form a fluidized mixture; a step of introducing the fluidized mixture into a mold; and a step of hardening the epoxy resin 20 contained in the fluidized mixture which has been introduced into the mold.

In the porous epoxy grindstone 40, the sol-gel abrasive grains shown in FIG. 4 are combined by a vitrified bonding agent into the abrasive agglomerates 24, and the abrasive agglomerates 24 are held together by the thermosetting synthetic resin bonding agent in the form of the epoxy resin 28. The abrasive agglomerates 24, each of which is larger than each sol-gel abrasive grain, are firmly held by the thermosetting synthetic resin bonding agent. Each of the sol-gel abrasive grains, which are bonded to each other by the vitrified bonding agent having a high degree of rigidity, restores its sharpness as a result of each of the successive removals of the fine crystals upon application of an impact or shock to the sol-gel abrasive grain, as in a vitrified grindstone, even if the porous epoxy grindstone 40 is adapted to have an increased degree of bonding strength so as to have an increased degree of wear resistance. Thus, the porous epoxy grindstone 40 exhibits a high degree of sharpness, and is accordingly capable of accurately and efficiently grinding a workpiece having a large amount of material to be removed or ground, at a high removal rate.

Since the abrasive agglomerates 24 are not precipitated and are dispersed evenly in the fluidized mixture in the process of producing the porous epoxy grindstone 40, it is possible to obtain an abrasive structure having a high quality.

In the porous epoxy grindstone 40, the content of the abrasive agglomerates 24 in all the abrasive grains contained in the abrasive structure of the porous epoxy grindstone 40 is at least 5 wt %, more preferably at least 20 wt %, for further increasing the degree of sharpness of the porous epoxy grindstone 40 so that the porous epoxy grindstone 40 is capable of more efficiently grinding a workpiece having a large amount of stock to be removed.

The grain size of each of the sol-gel abrasive grains, which constitute each abrasive agglomerate 24, is preferably F60–F100. The grade or bonding strength of the abrasive agglomerates 24 is preferably L or M. The content of the vitrified bonding agent in each of the abrasive agglomerates 24 is preferably about 15 wt %.

While the preferred embodiments of the present invention have been described above for illustrative purpose only, it is to be understood that the invention is not limited to the details of the illustrated embodiments.

For instance, the hybrid type resinoid grindstone is not limited to the gear grinding wheel 10 and the porous epoxy grindstone 40 which are used for grinding the teeth of a gear and a cutter, respectively, but may be any other kind of grindstone which is used for any other purpose.

While the epoxy resin 28 is used as the thermosetting synthetic resin bonding agent in the illustrated embodiments, a phenol resin or other resin may be used as the thermosetting synthetic resin bonding agent.

While each of the abrasive agglomerates 24 includes the sol-gel abrasive grains in the illustrated embodiments, the abrasive agglomerate 24 may include standard abrasive grains and/or super abrasive grains in addition to the sol-gel abrasive grains.

It is to be understood that the present invention may be embodied with various other changes, modifications and improvements, which may occur to those skilled in the art, without departing from the spirit and scope of the invention defined by the following claims:

What is claimed is:

1. A hybrid resinoid grindstone comprising:
    abrasive agglomerates which are held together by a thermosetting synthetic resin used as a bonding agent;
    wherein each of said abrasive agglomerates includes sol-gel abrasive grains which are held together by a vitrified bonding agent,
    and wherein each of said sol-gel abrasive grains comprises a polycrystal which is a combination of a plurality of crystals.

2. A hybrid resinoid grindstone according to claim 1, further comprising individual abrasive grains held together by said thermosetting synthetic resin, and which contains at least 5% by weight of said abrasive agglomerates per total weight of all abrasive grains contained in said hybrid type resinoid grindstone.

3. A hybrid resinoid grindstone according to claim 1, further comprising individual abrasive grains held together by said thermosetting synthetic resin, and which contains at least 20% by weight of said abrasive agglomerates per total weight of all abrasive grains contained in said hybrid type resinoid grindstone.

4. A hybrid resinoid grindstone according to claim 1, wherein each of said sol-gel abrasive grains has a grain size of F60–F100.

5. A hybrid resinoid grindstone according to claim 1, which is a gear grinding wheel including a tooth profile portion having teeth formed therein, and which further comprises individual abrasive grains which are held together by said thermosetting synthetic resin.

6. A hybrid resinoid grindstone according to claim 5, wherein said tooth profile portion is formed in an inner circumferential surface of said gear grinding wheel.

7. A hybrid resinoid grindstone according to claim 1, which is a porous epoxy grindstone to be used for grinding a cutter, and which further comprises individual abrasive grains which are held together by said thermosetting synthetic resin.

8. A hybrid resinoid grindstone according to claim 1, wherein each of said sol-gel abrasive grains has a grain size of about $1/100$ inch to $1/60$ inch.

9. A hybrid resinoid grindstone comprising:
    a resinoid abrasive structure in which abrasive agglomerates, individual abrasive grains and a pore forming agent are held together by a thermosetting synthetic resin used as a bonding agent,
    wherein each of said abrasive agglomerates includes sol-gel abrasive grains held together by a vitrified bonding agent.

10. A hybrid resinoid grindstone according to claim 9, wherein each of said sol-gel abrasive grains is a polycrystal which is a combination of a plurality of crystals.

* * * * *